United States Patent [19]
Tanaka

[11] Patent Number: 5,808,973
[45] Date of Patent: Sep. 15, 1998

[54] NEAR FIELD RECORDING AND REPRODUCING APPARATUS

[75] Inventor: Yoichiro Tanaka, Kanagawa-ken, Japan

[73] Assignee: Kabushiki Kaisha Toshiba, Kawasaki, Japan

[21] Appl. No.: 706,687

[22] Filed: Sep. 6, 1996

[30] Foreign Application Priority Data

Sep. 6, 1995 [JP] Japan .................................. 7-229035
Dec. 25, 1995 [JP] Japan .................................. 7-336970

[51] Int. Cl.$^6$ .................................................. G11B 13/00
[52] U.S. Cl. ............................................. 369/14; 369/126
[58] Field of Search ................. 369/14, 126, 112, 369/118, 109, 13, 121; 250/216; 300/114, 113

[56] References Cited

U.S. PATENT DOCUMENTS

| | | | |
|---|---|---|---|
| 4,604,520 | 8/1986 | Pohl ........................................ | 250/216 |
| 5,200,936 | 4/1993 | Allenspach et al. ...................... | 369/13 |
| 5,272,330 | 12/1993 | Betzig et al. ............................ | 250/216 |
| 5,343,460 | 8/1994 | Miyazaki et al. ....................... | 369/126 |
| 5,389,779 | 2/1995 | Betzig et al. ............................ | 250/216 |
| 5,602,820 | 2/1997 | Wickramasinghe et al. ........... | 369/126 |

FOREIGN PATENT DOCUMENTS

| | | |
|---|---|---|
| 1-271931 | 10/1989 | Japan . |
| 1-271946 | 10/1989 | Japan . |
| 1-273252 | 11/1989 | Japan . |
| 4-212729 | 8/1992 | Japan . |
| 7-225975 | 8/1995 | Japan . |

OTHER PUBLICATIONS

Near–Field Magneto–Optics and High Density Data Storage; E. Betzig, et al; Appl. Phys. Lett. 61(2), Jul. 13, 1992; pp. 142–144.

Optical Stethoscopy: Image Recording with Resolution; D.W. Pohl, et al; Appl. Phys. Lett. 44(7), Apr. 1, 1984; pp. 651–653.

Formation of Small Magnetic Domains by Scanning Near–Field Optical Microscope; T. Shintani, et al; Digest of the 18th Annual Conference on Magnetic in Japan; pp. 309a–309b, 1994 (no month available).

Primary Examiner—Tan Dinh
Attorney, Agent, or Firm—Oblon, Spivak, McClelland, Maier & Neustadt, P.C.

[57] ABSTRACT

A magnetic recording and optical readout apparatus and method, wherein a recording and readout head member records and reproduces a signal while moving relatively to a magnetic recording medium. The head member has a magnetic recording head and a readout head in a body. The head member is supported by a suspension so as to contact the medium or to keep a slight distance from the medium by a lifting-up force being generated by air flow, while moving relatively to the medium. A laser beam is radiated from a laser emitting element through a light transmitting hole formed in a light intercepting layer, whose diameter is smaller than the laser beam wavelength of the laser emitting element. By radiating the laser beam through the hole, localized near field electromagnetic waves are generated and reflected at the medium. The reflected electromagnetic waves bear changes of a polarization angle corresponding to the recorded information, which are detected by the readout head to reproduce the signal.

23 Claims, 7 Drawing Sheets

NEAR FIELD RECORDING AND REPRODUCING APPARATUS

BACKGROUND OF THE INVENTION

1. Field of the Invention

This invention relates to a recording and readout apparatus and method to record information magnetically and to reproduce the information optically, and especially to a recording and readout apparatus, and which enables high density recording.

2. Discussion of the Background Art

Hard disk systems are widely utilized as external storage apparatuses with a large storing capacity and are capable of random access for computers. Requirements for a larger storing capacity and higher density are increasing more and more so that various research and developments are being carried out to satisfy these requirements.

Usually, a hard disk system has a plurality of magnetic disks respectively including magnetic layers formed on both sides of a non-magnetic substrate and commonly secured to a rotating axis. Furthermore, the hard disk system has a plurality of recording and readout heads secured to an arm, each pair of which sandwich each disk.

The heads are positioned by moving the arm in a radial direction of the disks by an actuator. When a signal is recorded and reproduced, a head is arranged in a way that it keeps a slight distance from a surface of a disk rotating at a high speed and such that it accesses a predetermined position of the surface of the disk.

A signal corresponding to information is recorded and reproduced along tracks, such as concentric circles, on a surface of each disk.

In order to satisfy the requirement for a larger storage capacity in such hard disk systems, increasing a line recording density, i.e. a recording density in a track length direction, or increasing a track density by narrowing track width has been tried. A perpendicular magnetic recording method was proposed in 1975 as a method to increase a line recording density. This method conforms to high density recording because a magnetic transition length is narrow according to the method due to a theoretically very small demagnetizing field in the magnetic transition portion.

Active type heads have been also developed, which are represented by MR heads utilizing a magnetoresistance effect so as to increase the sensitivity of reproducing a recorded signal. The MR heads convert magnetic fluxes from a recording medium into electric signals by utilizing the fact that an electric resistance of a soft magnetic member, such as Ni—Fe alloy, changes depending on an external magnetic field. An MR head outputs a large readout signal independent of a relative speed between the head and the recording medium, as its readout sensitivity is proportional to a value of its sense current. Furthermore, the MR head enables narrowing a track width and increasing a track density owing to its characteristics of large reproduction output. An application system with a higher recording density is known in which an MR element is arranged adjacent to a main magnetic pole of a recording head and opposite a recording medium, and in which an above-mentioned perpendicular magnetic recording method is adopted, as is shown in Japanese patent publication No. 62-24848.

In background magnetic recording and readout apparatuses, readout is performed by forming a magnetic path including a magnetic recording medium and a portion of a readout head detecting a magnetic field or flux. In such background readout systems an essential problem arises that their reproduction resolution becomes small due to a broad sensitivity distribution of a readout head, which is caused by a non-magnetic spacing existing between the head and the recording medium. Even when a single magnetic pole head is used, whose reproducing resolution is theoretically defined by a thickness of its main magnetic pole, there still exists the problem that the reproduction resolution is small due to the spacing existing between the readout head and the recording medium. The spacing causes a decrease of efficient permeability of the edge portion of the head because it produces a demagnetizing field at the edge portion of the main magnetic pole. The decrease of efficient permeability functions to prevent concentration of magnetic fluxes from the recording medium to the head. As a result, reproducing resolution of the head is lowered remarkably.

A shield type MR head is known which increases reproducing resolution. The shield type MR head has a pair of high permeability shield layers which sandwich an MR element from its both sides in a relative moving direction between the head and a recording medium. In this type of MR head, it is necessary to narrow the distance between the shield layers in order to increase reproducing resolution. However, it is very difficult to decrease the distance between the shield layers where the MR element is placed from the view points of insulation between the MR element and the shields layers and of manufacturing. Furthermore, as the distance narrows between the shield layers, reproduction sensitivity decreases more through decrease of magnetic flux entering into the MR element, and also through reducing the depth from a surface of the recording medium to a position of the medium where the magnetic flux extends.

In addition, precise reproduction is difficult to obtain due to thermal asperity, when a recording and readout head, in order to increase the recording density, is placed in contact substantially with the recording medium or is moved keeping a slight distance from the medium, especially keeping a distance below about 50 nm.

On the other hand, a scanning near field optical microscope is known for high resolution, which can observe magnetic domains at an approximately 10 nm resolution by detecting light transmitted through the domains, as is shown in D. W. Pohl et al, Appl. Phys. Letter 44 (7), 651, 1984. Further, a reproduction technology, which reproduces a signal recorded in a photomagnetic recording medium at a high resolution, is shown in the Abstract of the 18th Technological Conference of the Japanese Applied Magnetic Society, 14pE-6, 1994. Using a scanning near field optical microscope, a signal is reproduced by radiating localized near field electromagnetic waves, called evanescent waves, directly onto a photomagnetic recording medium of Co/Pt. The signal is reproduced by detecting the localized near field electromagnetic waves transmitted through the recording medium.

However, in such a scanning near field optical microscope, it is necessary to arrange a detector and a light source on opposite sides of a recording medium, so that not only is the structure of the readout system complicated and large, but also the nature of the material of the recording medium is limited. In addition, it is theoretically impossible to reproduce a signal by the scanning near field optical microscope when the recording medium has recording layers on both sides. The intensity of the reproduced signal changes with a slight change of the distance below some tens nm between the detector and the recording medium in the scanning near field optical microscope, so that stable reproduction cannot be obtained when a disk-like recording medium is used and rotated at a high speed and with accompanying runout of few μm.

SUMMARY OF THE INVENTION

Accordingly, one object of the present invention is to provide a novel high resolution recording and readout apparatus and method.

Another object of the present invention is to provide a novel recording and readout apparatus and method which are able to obtain a stable reproduction output from a readout head.

A further object of the present invention is to provide a novel recording and readout apparatus of reduced size.

A still further object of the present invention is to provide a novel readout apparatus which is able to obtain a stable reproduction output.

The above objects of the present invention are achieved in the following aspects of the present invention.

A first aspect of the present invention is a recording and readout apparatus which applies a magnetic field to record a signal in a magnetic recording medium, which irradiates evanescent waves onto the magnetic recording medium, and which detects reflected evanescent waves from the magnetic recording medium to reproduce the signal recorded in the magnetic recording medium.

A second aspect of the present invention is a recording and readout method which applies a magnetic field to a plurality of areas of a magnetic layer constituting a magnetic recording medium in an area-by-area manner to record a signal in the areas, which introduces a laser beam to a light transmitting portion formed in a light intercepting layer disposed with a space and in opposition to the magnetic recording medium to produce and radiate near field electromagnetic waves onto the medium, the light transmitting portion having a diameter substantially smaller than a wavelength of the laser beam, and which detects the electromagnetic waves reflected from the magnetic recording medium to reproduce the signal recorded in the magnetic recording medium.

A third aspect of the present invention is a recording and readout apparatus including a head member having a recording head to record a recording signal in a magnetic recording medium and a readout head to reproduce the signal recorded in the recording medium. A mechanism drives the magnetic recording medium, and a suspending unit supports the head member in contact with or spaced from the magnetic recording medium. The readout head includes a laser beam emitting element, a light intercepting layer disposed in opposition to the magnetic recording medium and having a light transmitting portion with a diameter smaller than a wavelength of the laser beam where the laser beam is radiated to produce near field electromagnetic waves. A detector detects electromagnetic waves reflected from the recording medium.

A fourth aspect of the present invention is a recording and readout apparatus including a head member having a recording head to record a recording signal in a magnetic recording medium and a readout head to reproduce the signal recorded in the recording medium. A mechanism drives the magnetic recording medium, and a suspending unit supports the head member in contact with or spaced from the magnetic recording medium. The readout head includes a laser beam emitting element, a magnetic slave layer disposed in opposition to the magnetic recording medium, a light intercepting layer which is formed on the laser emitting element side of the magnetic slave layer and has a light transmitting portion with a diameter smaller than the laser beam wavelength where the laser beam is radiated to produce near field electromagnetic waves. A detector detects reflected electromagnetic waves from the magnetic slave layer.

A fifth aspect of the present invention is a readout apparatus to reproduce information recorded in a magnetic recording medium which radiates evanescent waves onto the magnetic recording medium in which information is magnetically recorded, and which detects reflected evanescent waves from the magnetic recording medium to reproduce the signal recorded in the magnetic recording medium.

A sixth aspect of the present invention is a readout apparatus to reproduce information recorded magnetically including a mechanism to drive a magnetic recording medium, a readout head opposing the magnetic recording medium, and a suspending unit to support the readout head in contact with or with a slight space from the magnetic recording medium. The readout head includes a laser beam emitting element, a light intercepting layer disposed in opposition to the magnetic recording medium and having a light transmitting portion with a diameter smaller than a wavelength of the laser beam where the laser beam is radiated to produce near field electromagnetic waves. A detector detects electromagnetic waves reflected from the recording medium.

A seventh aspect of the present invention is a recording and readout apparatus including a head member having a recording head to record a recording signal in a magnetic recording medium and a readout head to reproduce the signal recorded in the recording medium. A mechanism drives the magnetic recording medium, and a suspending unit supports the head member in contact with or spaced from the magnetic recording medium. The readout head includes a laser beam whose light emitting end opposes the recording medium and a detector is arranged to oppose the other end of the laser emitting element and to detect a reflected light from the recording medium.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Preferred embodiments of the present invention will be explained hereinafter with reference to the drawings, wherein like reference numerals designate identical or corresponding parts.

Figure 1:
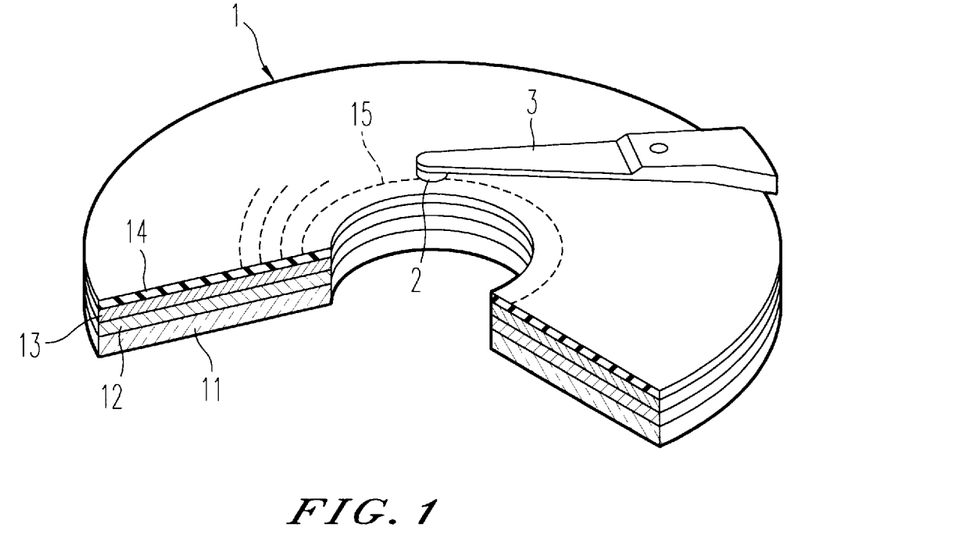
FIG. 1 shows a schematic and oblique view of a recording and readout apparatus according to an embodiment of the present invention.

FIG. 1 shows a schematic and oblique view of a recording and readout apparatus according to an embodiment of the present invention. The recording and readout apparatus of this embodiment includes magnetic recording medium 1 and head member 2 to record and reproduce information. Magnetic recording medium 1 is a magnetic disk having a configuration such as of a circular plate. Medium 1 has non-magnetic disk substrate 11, on which underlayer 12 is formed. Recording layer 13 is formed on underlayer 12. Protecting layer 14 is formed on recording layer 13 to assure electrical insulation and durability against contact of head member 2. To explain one example in detail, substrate 11 is preferably a glass substrate which has an 1.8 inch diameter and 0.4 mm thickness. Underlayer 12 is preferably a Pt layer having a thickness of about 50 nm which is produced on substrate 11 by DC sputtering in an argon gas atmosphere. Recording layer 13 is preferably a Co/Pt multi-layer with perpendicular magnetic anisotropy having a thickness of 20 nm which is produced on underlayer 12 by DC sputtering in an argon gas atmosphere. A coercive force of recording layer 13 is about 2,800 Oe, and the saturation magnetization of layer 13 is 6,000 G. Protecting layer 14 is a $ZrO_2$ film of a thickness of about 8 nm which is formed by RF sputtering.

Head member 2 is a body constituted by a recording head to record a signal magnetically and a readout head to reproduce a recorded signal. Head member 2 is supported by a head supporting member, for example, a needle-like ceramic head arm 3. Head member 2 may move above magnetic recording medium 1 while it bears a lifting-up force being produced by air flow so as to keep a slight spacing from recording medium 1. Alternatively, head member 2 may be made in contact with and move on recording medium 1.

A plurality of concentric tracks 15 are formed on recording medium 1. Head member 2 is positioned to the tracks by head arm 3 which is driven by an actuator (not shown).

Figure 2:
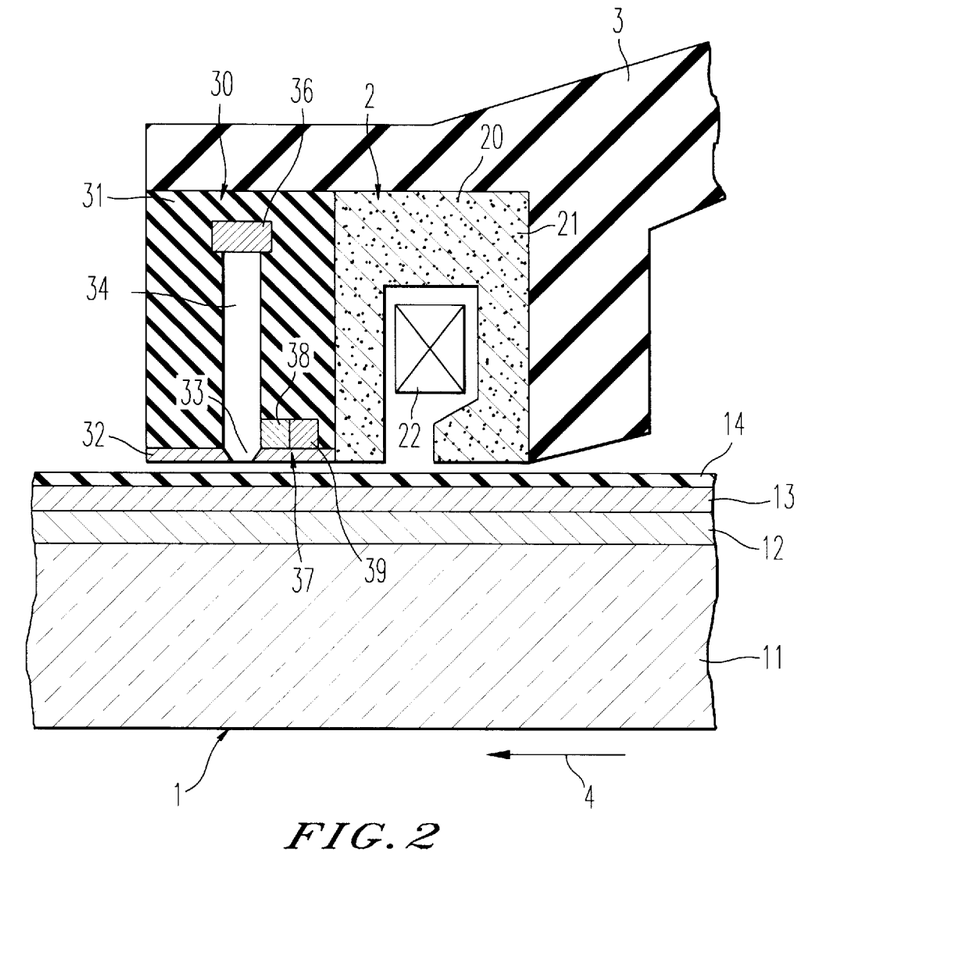
FIG. 2 shows a sectional view of a magnetic recording medium and a recording and readout head employed in the recording and readout apparatus of FIG. 1.

FIG. 2 is a schematic sectional view of recording medium 1 and head 2 in a relative moving direction. In FIG. 2, arrow 4 shows a moving direction of recording medium 1. As an example, recording head 20 of head member 2 is a ring-like head of an inductive type. Recording head 20 has magnetic core 21 of FeN, a high permeability material formed at an edge portion of head arm 3 by DC sputtering. Recording head 20 also has recording coil 22 of a half turn formed by a thin film process and wound on magnetic core 21. Both terminals of recording coil 22 are electrically connected to the recording current output terminals of a recording current amplifier (not shown).

A signal is recorded in recording medium 1 magnetically by applying a recording field which is produced from the edge of main magnetic pole 21.

Readout head 30 is disposed adjacent to recording head 20. Non-magnetic insulating member 31 is arranged adjacent to magnetic pole 21 in readout head 30. Insulating member 31 and magnetic pole 21 of recording head 20 constitute a body. Insulating member 31 has a surface opposite and parallel to recording medium 1. Light shielding layer 32, preferably of Pt, is formed on the opposite surface of insulating member 31. Light shielding layer 32 has a thickness of about 1,500 nm. A small and substantially circular light transmitting hole 33 is formed in light shielding layer 32. Light transmitting hole 33 may be filled with a light transmitting member. Light path 34 is formed in non-magnetic insulating member 31 to extend upward from light transmitting hole 33. A diameter of light path 34 is larger than that of light transmitting hole 33. Light path 34 may be hollow or may be a light waveguide such as an optical fiber.

Laser emitting element 36, for example a semiconductor laser diode, is arranged on the top of light path 34. Light detector 37 with a polarizer is disposed adjacent to light transmitting hole 33 on light shielding layer 32. Photodetector 37 has a polarizer 38 and photoelectric converting element 39 and outputs an electrical signal corresponding to changes of a polarization angle of incident light.

The diameter of light transmitting hole 33 is smaller than a wavelength of the laser beam emitted from laser emitting element 36. For example, the wavelength of the laser beam can be about 790 nm, and the diameter of light transmitting hole 33 can be 40 nm, which is about one twentieth of the wavelength of 790 nm.

Figure 3:
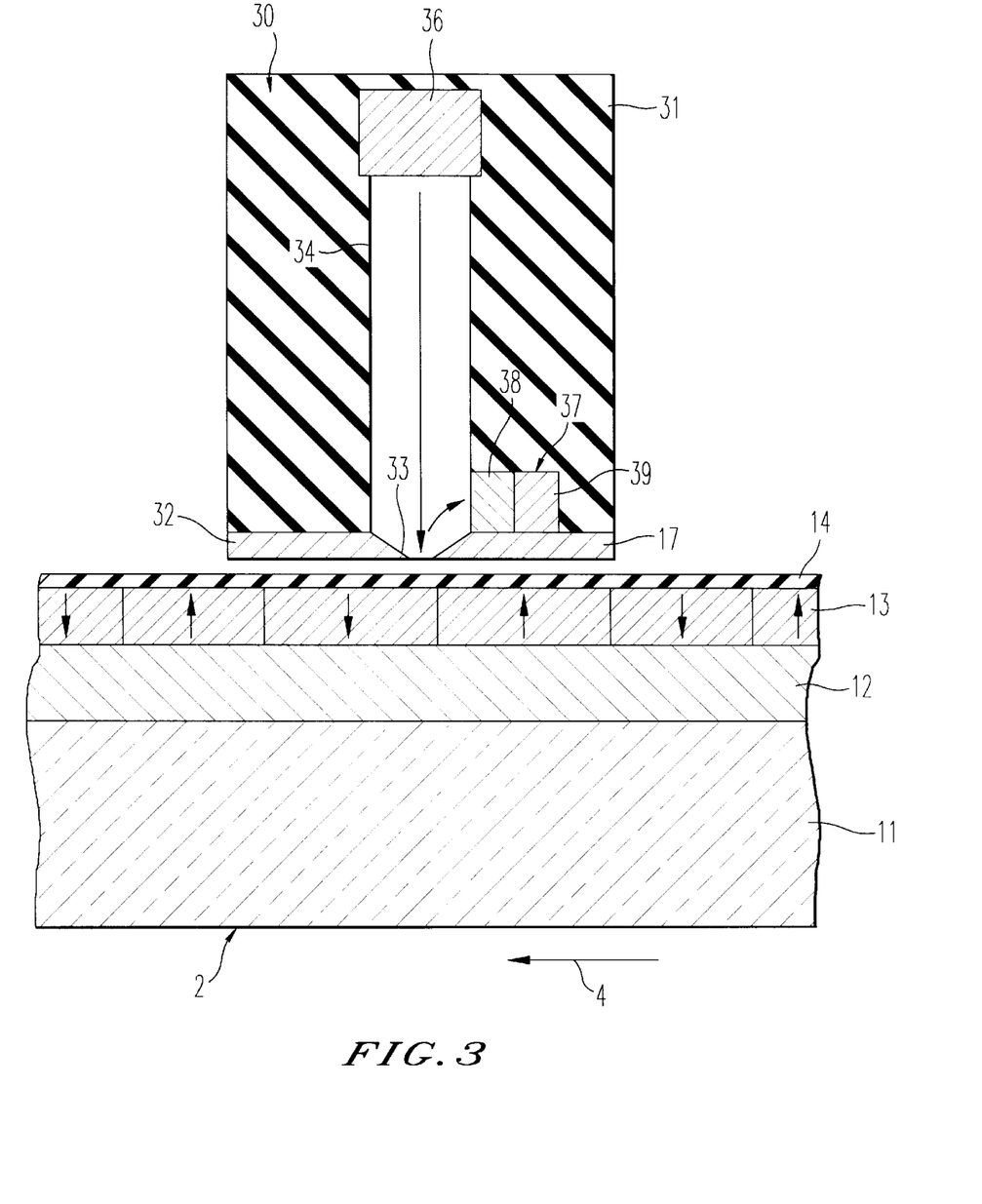
FIG. 3 shows a magnified sectional view of a readout head member which is employed in the recording and readout head of FIG. 2.

A readout operation of the above mentioned embodiment will now be explained in detail with reference to FIG. 3. FIG. 3 shows a magnified sectional view of the readout part including readout head 30 in FIG. 2.

In readout, a laser beam is emitted from laser emitting element 36 and is radiated onto light transmitting hole 33 of light shielding layer 32 through light path 34. The diameter of light transmitting hole 33 is smaller than that of the wavelength of the laser beam so that localized near field electromagnetic waves, i.e. evanescent waves, arise at light transmitting hole 33. These localized near field electromagnetic waves leak out from light transmitting hole 33 to magnetic recording medium 1 and are reflected at the surface of recording medium 1.

As a signal corresponding to information is recorded magnetically in recording layer 13, the polarization angle of the reflected light from magnetic recording medium 1 changes according to magnetic transitions of recording layer 13 by a Kerr effect. In other words, the reflected light bears a Kerr rotation. The aforementioned signal is recorded by a Vertical Magnetic Recording Method so that the changes of the polarization angle are sufficiently large. Planar recording can also be used, but the change in polarization angle is smaller than in vertical recording. Part of the reflected light from recording medium 1 passes through light transmitting hole 33 and enters directly into photodetector 37 with polarizer 38 which is close to hole 33. Detector 37 outputs a signal corresponding to changes of polarization angles of the reflected light from recording medium 1. The changes of polarization angles of the reflected light correspond to a recorded signal in recording layer 13.

Accordingly, a reproduced signal is output from photoelectric converting element 39 which corresponds to a signal recorded in recording layer 13.

Figure 4:
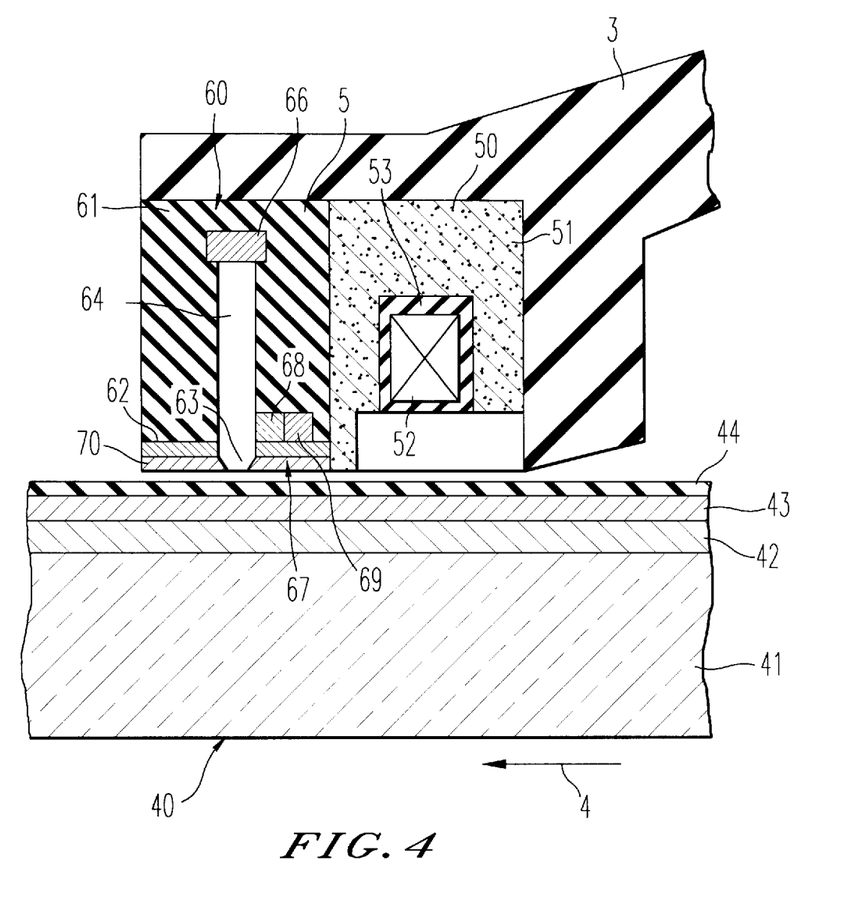
FIG. 4 shows a sectional view of a magnetic recording medium and a recording and readout head employed in the recording and readout apparatus according to another embodiment of the present invention.

FIG. 4 shows a magnetic recording medium and recording and readout head according to another embodiment of the present invention. The arrow 4 shows a relative moving direction between the recording medium and the head.

As one example, disk substrate 41 constituting magnetic recording medium 40 is preferably a glass which has an 2.5 inch diameter and 0.635 mm thickness. Soft magnetic under layer 42 is preferably a FeTaSiN layer having a thickness of 0.12 μm which is produced on substrate 41 by DC sputtering in an argon gas atmosphere. A coercive force of layer 42 is 2 Oe in a surface direction, and the saturation magnetic flux density Bsb is 16,000 G. Recording layer 43 is preferably a Co/Pd multi-layer of perpendicular magnetic anisotropy having a thickness of 40 nm which is produced on underlayer 42 by DC sputtering in an argon gas atmosphere. A coercive force of recording layer 43 is about 4,400 Oe in a vertical direction and the saturation magnetization of layer 43 is 5,000 G. Protecting layer 44 is preferably a carbon film of a thickness of about 8 nm which is formed by RF sputtering.

Head member 5 is a body constituted by recording head 50 to record a signal magnetically and readout head 60 to reproduce a recorded signal. Head member 5 is supported by a head supporting member, for example, a needle-like ceramic head arm 3 of, for example, $Al_2O_3$.

Head member 5 opposes magnetic recording medium 40 and is spaced from the medium 40. Recording head 50 is a vertical single magnetic pole type. Recording head 50 is constituted by main magnetic pole 51 and recording coil 52. Main magnetic pole 51 is a laminated high permeability material of FeN which is produced by a high frequency sputtering process. Recording coil 52 is about a half turn which is covered by insulating member 53 and is buried in a groove of main magnetic pole 51.

As an example, the thickness of the edge of main magnetic pole 51 of 0.3 μm in a relative moving direction between head 50 and medium 40, and its saturation magnetic flux density is 20,000 G. The number of turns of recording coil 52 may be plural, for example 6. Both ends of recording coil 52 are connected to output terminals of a recording amplifier (not shown) to output a recording current. By providing the recording current, a recording magnetic field is generated from the edge of main pole 51 so that a signal is recorded in recording layer 43 of magnetic recording medium 40 magnetically.

Readout head 60 is disposed adjacent to recording head 50. Readout head 60, as in the aforementioned first embodiment, is provided with non-magnetic insulating member 61, light shielding layer 62 with light transmitting hole 63 whose diameter is smaller than a laser wavelength, light path 64, laser emitting element 66 to emit the laser beam, and detector 67 with polarizer 68 and photoelectric converting element 69. Readout head 60 is additionally provided with magnetic slave layer 70 on a recording layer side surface of light shielding layer 62.

Magnetic slave layer 70 is constituted by a Co alloy, for example, which forms magnetization according to a magnetic field from recording medium 40. The coercive force of magnetic slave layer 70 is about 50 Oe, and its residual magnetism is 5,000 G.

Figure 5:
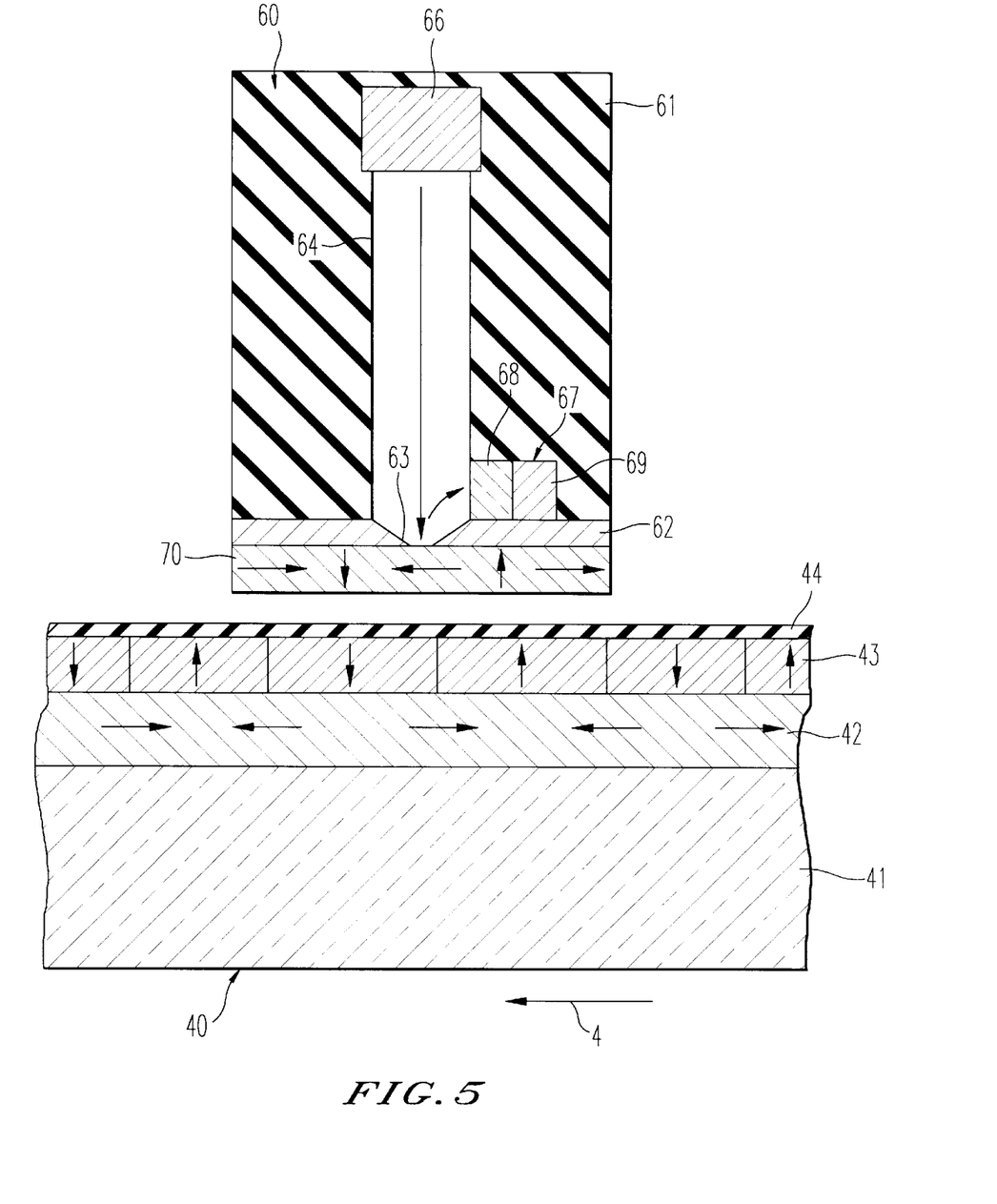
FIG. 5 shows a magnified sectional view of a readout head member which is employed in the recording and readout head of FIG. 4.

A readout operation of this embodiment will be explained with reference to FIG. 5. FIG. 5 shows a magnified sectional view of the readout part including readout head 60 of FIG. 4.

Soft magnetic underlayer 42, recording layer 43 and magnetic slave layer 70 are combined static-magnetically with each other, which forms a magnetization of a stable circular mode. Magnetic slave layer 70 opposing recording medium 40 is magnetized by a leakage field from recording layer 43 based on a signal recorded in recording layer 43. The coercive force of magnetic slave layer 70 is slightly smaller than that of recording layer 43 so that magnetic slave layer 70 is easily magnetized by the leakage field from recording layer 43.

In readout, a laser beam is emitted from laser emitting element 66 and is radiated to light transmitting hole 63 of light shielding layer 62 through light path 64. Localized electromagnetic wares called evanescent waves arise at light transmitting hole 63, as hole 63 has a diameter smaller than a wavelength of the laser beam. The localized near field electromagnetic waves leak out from light transmitting hole 63 through the magnetic slave layer 70, and are reflected at the surface of magnetic slave layer 70. A signal is recorded magnetically in recording layer 43 of vertical magnetic anisotropy. Therefore, a magnetization pattern is formed in magnetic slave layer 70 in accordance with the magnetization pattern of recording layer 43. As a result, the reflected light from magnetic slave layer 70 bears changes of polarization angles by a Kerr effect, i.e. Kerr rotations, which correspond to magnetic transitions of recording layer 43.

The reflected light from magnetic slave layer 70 passes through light transmitting hole 63, and enters photodetector 67 with polarizer 68. Photodetector 67 outputs a signal according to the incident light, i.e., to changes of polarization angles of the reflected light from magnetic slave layer 70.

The changes of polarization angles of reflected light from magnetic slave layer 70 correspond to the signal recorded in recording layer 43. Thus, a reproduced signal, which corresponds to the recorded signal in recording layer 43, is output from light detector 67 and is led out of head member 50 through electric connections (not shown).

Figure 6:
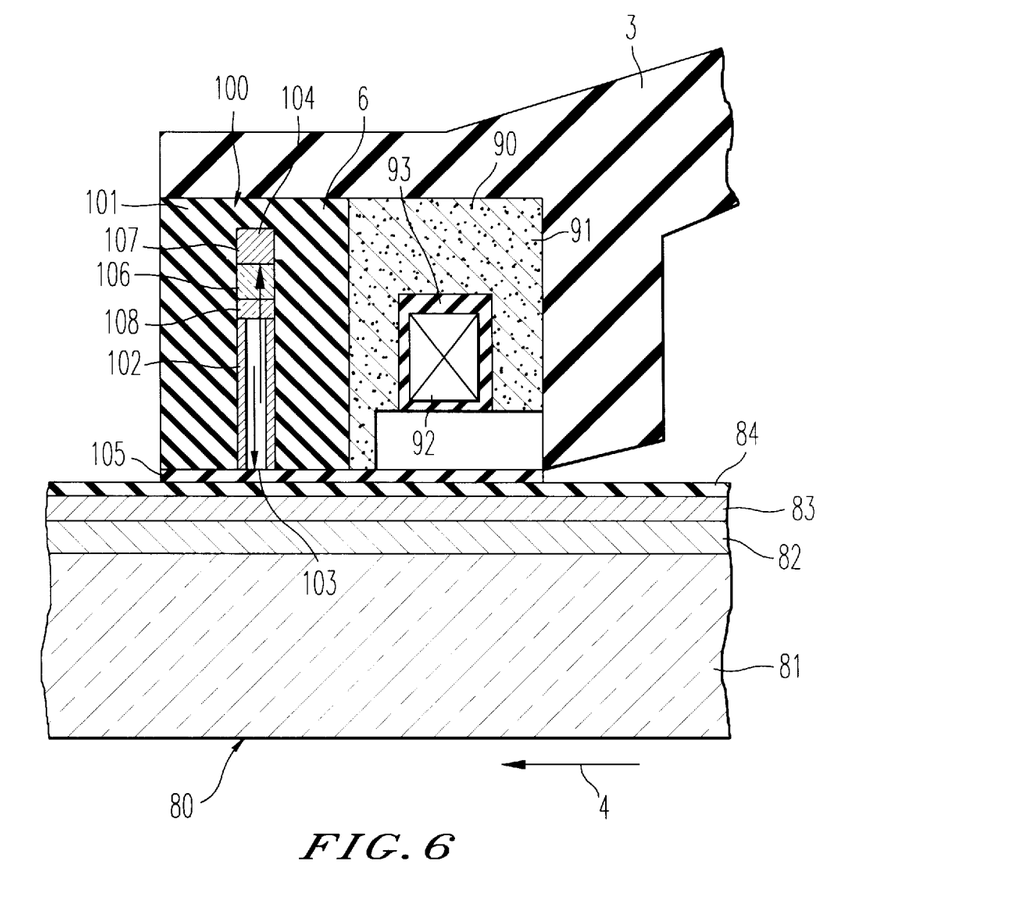
FIG. 6 shows a sectional view of a magnetic recording medium and a recording and readout head employed in the recording and readout apparatus according to a further embodiment of the present invention.

FIG. 6 shows a schematic sectional view of a magnetic recording medium and a recording and readout head in their relative moving direction in a recording and readout apparatus according to a further embodiment of the present invention.

The recording and readout apparatus of this embodiment includes magnetic recording medium 80 and head member 6 to record and reproduce information. Magnetic recording medium 80 is a magnetic disk having a configuration such as of a circular plate. Medium 80 has non-magnetic disk substrate 81, on which underlayer 82 is formed. Recording layer 83 is formed on underlayer 82. Protecting layer 84 is formed on layer 83 to assure electrical insulation and durability against contact of head member 6.

To explain one example in detail, substrate 11 is preferably a glass substrate which has an 1.8 inch diameter and 0.4 mm thickness. Underlayer 82 is preferably a FeZrSi layer having a thickness of 0.12 nm which is produced on substrate 11 by DC sputtering in an argon gas atmosphere. Recording layer 83 is preferably a Co/Pt multi-layer of perpendicular magnetic anisotropy having a thickness of 30 nm which is produced on underlayer 82 by DC sputtering in an argon gas atmosphere. The coercive force of underlayer 82 is 6 Oe in the surface direction, and its saturation magnetic flux density is 15,000 G. The coercive force of recording layer 83 is 2,800 Oe, and the saturation magnetization of layer 83 is 6,000 G. Protecting layer 84 is preferably a $ZrO_2$ film having a thickness of 8 nm which is formed by RF sputtering.

Head member 6 is a body constituted by a recording head 90 to record a signal magnetically and a readout head 100 to reproduce a recorded signal. Head member 6 is supported by a head arm 3, for example a needle-like ceramic head supporting member. Head member 6 may move above magnetic recording medium 80 while it bears a lifting-up force being produced by air flow and spaced therefrom by about 50 nm or less. Alternatively, head member 6 may be in substantial contact with and move on recording medium 1. A plurality of concentric tracks are formed on recording medium 80 (not shown). Head member 6 is positioned to the tracks by head arm 3 which is driven by an actuator (not shown).

Recording head 90 constituting head member 6 is a single magnetic pole head for the use of vertical magnetic recording, and is arranged vertically against medium 80. Recording head 90 has magnetic core 91 of FeSi, a high permeability material, formed at an edge portion of head arm 3 by high frequency sputtering. Recording head 90 has also recording coil 92 of a half turn formed by a thin film process and wound on magnetic core 91. Coil 92 is covered by non-magnetic insulating member 93. Main magnetic core 91 has a thickness of 0.02 μm at its edge portion in a relative direction between the head 90 and medium 80, and has a saturation magnetic flux density of 19,000 G. Both terminals of recording coil 92 are electrically connected to recording current output terminals of a recording amplifier (not shown).

A signal is recorded in recording medium 80 in a vertical direction magnetically by applying a recording field which is produced by the edge of main magnetic pole 91.

Readout head 100 is disposed adjacent to recording head 90. Non-magnetic insulating member 101 of alumina is arranged adjacent to magnetic pole 91 in readout head 30. Insulating member 101 and magnetic pole 91 of recording head 90 constitute a body. Insulating member 101 has a surface opposite and parallel to recording medium 80. Laser emitting element 102 is buried in insulating member 101 in order that the emission end surface of element 102 is positioned in the same plane of insulating member 101 facing medium 80.

In addition, photodetector 104 is buried in insulating member 101 so as to face a back end surface of laser emitting element 102 at an opposite side of the laser emission end surface. Reference number 108 indicates a light transmitting member. Photodetector 104 has a polarizer 106 and a photodetector 107, and outputs an electric signal corresponding to changes of polarization angles of an incident light. Head protecting layer 105 is formed on the beam emission end surface 103 of laser emitting element 102 and extends onto the surface of recording head 90 opposing medium 80. Head protecting layer 105 protects laser emitting element 102 from mechanical wear by touching medium 80 and chemical erosion. Head protecting layer 105 is preferably a $Si_3N_4$ film of a 6 nm thickness having a nature of transmitting light. Element 108 is a light transmitting material, such as glass, or alternatively is a space. Also, element 108 could be eliminated.

Laser emitting element 102 is a semiconductor laser diode which is formed by a thin film process. The beam emission end surface 103 of element 102 has a band-like configuration extending in a recording track width direction, i.e. a vertical direction to FIG. 6. A laser beam is radiated in substantially a straight line from band-like beam emission end surface 103, and is radiated onto magnetic recording medium 80. The distance between beam emission end surface 103 of element 102 and vertical magnetic recording layer 83 of medium 80 may be, even when including thicknesses of protecting layers 84, 105 and the spacing due to surface roughness, below 20 nm at most, which is very small compared with laser emission wavelength, i.e. some hundreds nm.

Accordingly, the laser beam emitted from beam emission end surface 103 is radiated onto a small area on recording medium 80 and almost without spreading.

The laser beam radiated onto medium 80 is reflected, and in which a polarization angle is rotated due to a Kerr Effect depending on the direction and intensity of recording signal magnetization of the vertical recording medium 82. This reflected light enters the beam emission end surface 103, passes through the inside of laser emitting element 102, and is output from the back end surface, and enters into photodetector 104. Photodetector 104 outputs a signal corresponding to changes in polarization angles of the reflected light from medium 80, which is incident to detector 104 via laser emitting element 102. As explained above, the changes in a polarization angle of the reflected light from medium 80 corresponds to the signal recorded in vertical magnetic recording layer 83. Thus, a reproduction signal is output from detector 104, which corresponds to the recorded signal in recording layer 83.

Laser emitting element 102 radiates a beam from the back end surface opposing beam emission end surface 103 of element 102, but the amount of change in the polarization angle of the emitted light is very small. Accordingly, detector 104 senses the reflected light with changes of the polarization angle from medium 80 via laser emitting element 102, but does not sense the direct beam from the back end surface of element 102 substantially.

According to the aforementioned embodiment, it is not necessary to arrange any optical element, for example, a beam splitter, to separate light paths of a beam incident to an objective lens and recording medium and that reflected from the medium, as in a conventional apparatus. Accordingly, it is possible to move head member 6 close to and above magnetic recording medium 80 with a slight spacing against medium 80 while it bears a lifting-up force caused by air flow, or to move head member 6 in contact with medium 80. Thereby, the distance between beam emission end surface 103 of laser emitting element 102 and recording layer 83 of medium 80 is kept stably below some tens of nm, especially below 50 nm, which is sufficiently smaller than the laser wavelength of laser emitting element 102. Thus, the laser beam hardly spreads and is radiated onto a very small area of a recording track on medium 80 so that it is possible to reproduce at a high reproduction resolution determined by the laser beam wavelength stably. In this embodiment, as an objective lens is not employed, an actuator is not needed to drive an objective lens to control focusing, and a seek operation may be carried out at a high speed due to a decreased mass of the simplified readout head system.

Figure 7:
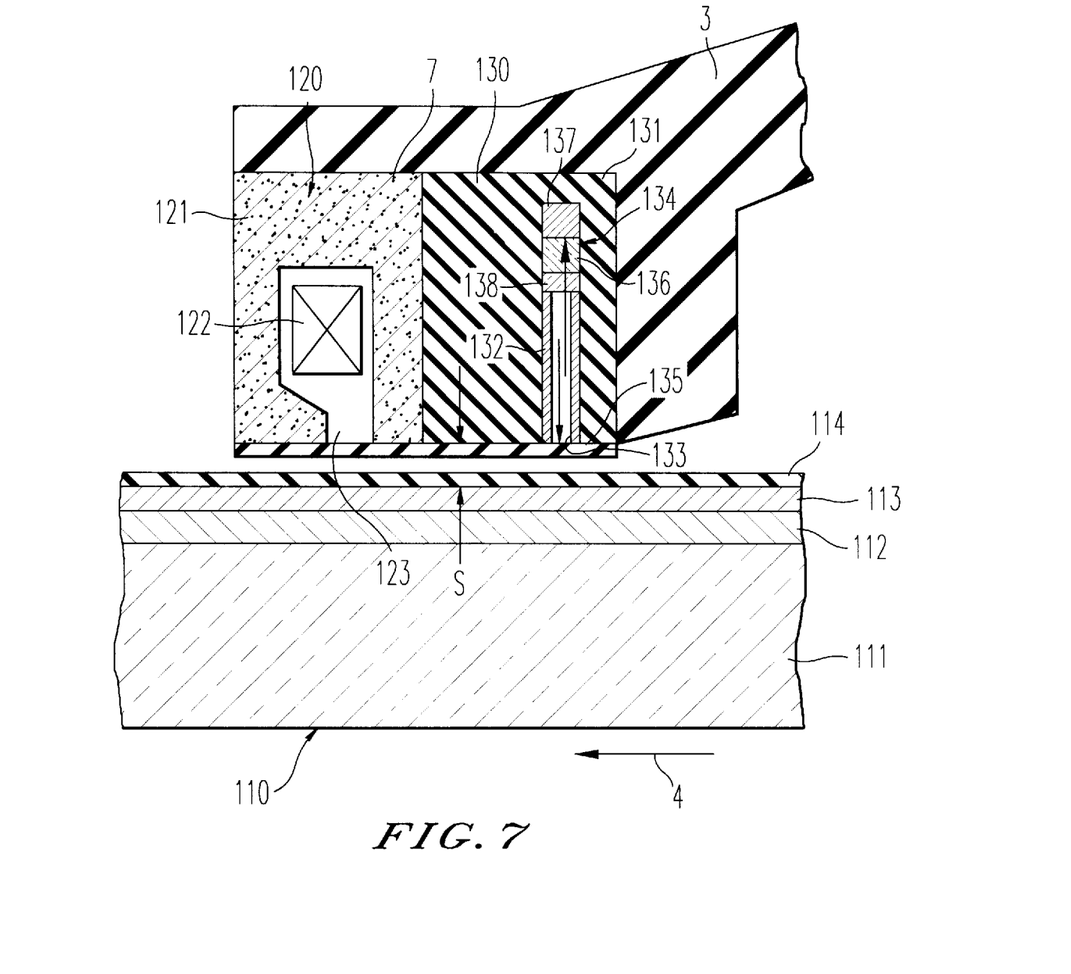
FIG. 7 shows a sectional view of a magnetic recording medium and a recording and readout head employed in the recording and readout apparatus according to a further embodiment of the present invention.

FIG. 7 is a schematic sectional view of recording medium 110 and head 7 with a relative moving direction. In FIG. 7, the arrow 4 shows a moving direction of recording medium 110.

Magnetic recording medium 100 is a magnetic disk having a configuration such as of a circular plate. Medium 100 has non-magnetic disk substrate 111, on which underlayer 112 is formed. Recording layers 113 is formed on underlayer 112. Protecting layer 114 is formed on layer 113 to assure electrical insulation and durability against contact of head member 7.

To explain one example in detail, substrate 111 is preferably a glass substrate which has an 2.5 inch diameter and about a 0.635 mm thickness. Underlayer 12 is preferably a Cr layer having a thickness of about 10 nm which is produced on substrate 111 by DC magnetron sputtering in an argon gas atmosphere. Magnetic recording layer 113 is preferably a Co/Pt/Cr multi-layer with planar magnetization and has a thickness of about 20 nm. Layer 113 is produced on underlayer 112 by DC magnetron sputtering in an argon gas atmosphere. A coercive force in a surface direction of recording layer 113 is about 2,400 Oe, and a saturation magnetism of layer 113 is about 2,000 G. Protecting layer 14 is a light transmissive diamond-like carbon (DLD) film having a thickness of about 8 nm, and is formed by RF sputtering, for example.

Head member 7 is a body constituted by recording head 120 to record a signal magnetically and a readout head 130 to reproduce a recorded signal. Head member 7 is supported by a head supporting member, for example, needle-like ceramic head arm 3 which includes a composite material of $Al_2O_3$ and stainless steel. Head member 7 opposes magnetic recording medium 111 so as to keep a spacing from medium 110.

Recording head 120 of head member 7 is preferably a ring-like head of an inductive type. Recording head 120 has a magnetic core 121 of CoFeZr, a high permeability material formed at an edge portion of head arm 3 by DC sputtering, for example. Recording head 120 also has recording coil 122 of a half turn formed by a thin film process and wound on magnetic core 121. The saturation magnetic flux density of magnetic core 121 is about 1.6 T.

Both ends of recording coil 122 are electrically connected to output terminals of a recording current amplifier (not shown). A recording current is provided from the recording current amplifier to recording coil 122 so that a signal is recorded magnetically in recording medium 110 by a recording field which is generated from magnetic gap 123 of about 0.16 μm formed in an opposite part of magnetic core 121 to medium 110.

It is possible to form a very sharp magnetization transition by the steep and strong recording magnetic field with the use of recording head 120 with such a high saturation magnetic flux density and narrow gap 123. The magnetic transition width of recording layer 113 is about 0.04 μm, which is much more narrow compared with that of a photomagnetic recording, for example, 0.2 μm, which records a signal by radiating a laser beam directly onto a medium.

Readout head 130 is arranged adjacent to recording head 120 and has a non-magnetic insulating member 131. Member 131 is disposed adjacent to magnetic core 121 and forms a body together with core 121. Laser emitting element 132, photodetector 134, polarizer 136 and photoelectric converting element 137 are arranged in insulating member 131 as in the embodiment of FIG. 6. Element 138 is a light transmitting material, or alternatively is a space. Also, element 138 could be eliminated.

According to the structure of readout head 130, it is possible to reproduce a high density signal recorded by recording head 120 easily and at a high sensitivity. To explain readout head 130 in detail, laser emitting element 132 is preferably a semiconductor laser with a 560 nm laser wave-length, whose beam emission end surface 133 opposes the magnetic recording medium. Film 135 is a head protecting layer. Spacing S from the surface of the readout head 130 opposing medium 110 to medium 110 is about 18 nm, including a 8 nm thickness of protecting layer 114, and is smaller than the laser wavelength. According to this embodiment, the same advantages are obtained as those of the embodiment of FIG. 6.

In the aforementioned embodiments of the present invention, a disk-like magnetic recording medium is used, but a tape-like magnetic recording medium may be used in which a recording layer is formed.

In the embodiments shown in FIGS. 2–5, the sections of the light transmitting holes of the light shielding layers may be generally shaped as circles or non-circles which generate localized near field electromagnetic waves. In the aforementioned embodiments, recording coils are a half-turn, but may be plural turns, for example, 10 turns.

As explained above, according to the present invention, localized near field electromagnetic waves, i.e. evanescent waves, are used and which are generated at a light transmitting portion having a diameter smaller than a laser wavelength, or a light from beam emission end of a laser emitting element is directly used. Thus, it is possible to reproduce a signal recorded in a magnetic recording medium at a high resolution by detecting a magnetic field from the medium.

In the present invention, reproduction is preferably performed by detecting reflected electromagnetic waves or a reflected laser beam from the medium so that a recording and a readout head may constitute a body of a reduced size and may be placed on one side of the medium. Thus, the nature of a material constituting the magnetic recording medium is not so limited. Reproduction can be performed even when a magnetic recording medium has recording layers on its both sides.

Even when the recording medium rotates at a high speed accompanying fluttering with some microns in amplitude, a head member, which includes a recording and a readout head in a body, may follow the movement of the surface of the recording medium precisely and carry out stable reproduction while keeping a spacing below some tens of nm, especially below 50 nm from the medium.

According to the present invention, optical reproduction is adopted so that reproduction outputs are stable, even when heat is generated while the magnetic recording medium rotates.

Obviously, numerous additional modifications and variations of the present invention are possible in light of the above teachings. It is therefore to be understood that within the scope of the appended claims, the present invention may be practiced otherwise than as specifically described herein.

What is claimed as new and is desired to be secured by Letters Patent of the United States is:

1. A recording and readout apparatus comprising:
   an applying means for applying only a magnetic field to magnetically record a signal in a magnetic recording medium;
   a radiating means for radiating near field electromagnetic waves onto the magnetic recording medium; and
   a detecting means for detecting reflected near field electromagnetic waves from the magnetic recording medium to reproduce the signal recorded in the magnetic recording medium.

2. The recording and readout apparatus according to claim 1, wherein the detecting means detects changes in a polarization angle of the near field electromagnetic waves.

3. The recording and readout apparatus according to claim 1, wherein the applying means applies a magnetic field in a direction substantially perpendicular to the magnetic recording medium.

4. A recording and readout method, comprising the steps of:
   applying only a magnetic field into a plurality of areas of a magnetic layer constituting a magnetic recording medium in an area-by-area manner to record a signal in each area;
   irradiating a laser beam to produce and radiate near field electromagnetic waves onto the magnetic recording medium; and detecting the near field electromagnetic waves reflected from the magnetic recording medium, to reproduce the signal recorded in the magnetic recording medium.

5. The recording and readout method according to claim 4, wherein the step of detecting the near field electromagnetic waves include detecting changes in a polarization angle of the reflected near field electromagnetic waves corresponding to each of the areas.

6. The recording and readout method according to claim 4, wherein the step of applying only a magnetic field to record a signal includes applying only a magnetic field in a direction substantially perpendicular to the magnetic recording medium.

7. A recording and readout apparatus comprising:

a head member having a recording head to magnetically record a signal in a magnetic recording medium by applying only a magnetic field and a readout head to reproduce the signal recorded in the magnetic recording medium;

the readout head including a laser beam emitting element, a light shielding layer disposed opposite to the magnetic recording medium and having a light transmitting portion, with a diameter smaller than a wavelength of the laser beam, to which the laser beam is radiated, to produce near field electromagnetic waves; and a detecting means to detect near field electromagnetic waves reflected from the magnetic recording medium.

8. The recording and readout apparatus according to claim 7, wherein the detecting means detects changes in a polarization angle of the reflected near field electromagnetic waves.

9. The recording and readout apparatus according to claim 7, wherein the recording head records the signal by applying only a magnetic field in a direction substantially perpendicular to the recording medium.

10. The recording and readout apparatus according to claim 7, wherein the detecting means is arranged proximate to the light transmitting portion.

11. A recording and readout apparatus comprising:

a head member having a recording head to magnetically record a recording signal in a magnetic recording medium and a readout head to reproduce the signal recorded in the recording medium;

the readout head including a laser beam emitting element, a magnetic slave layer disposed opposite the magnetic recording medium, a light shielding layer formed on a laser beam emitting element side of the magnetic slave layer and having a light transmitting portion with a diameter smaller than a laser beam wavelength of the laser beam, to which the laser beam is radiated, to produce near field electromagnetic waves; and a detecting means to detect reflected electromagnetic waves from the magnetic slave layer.

12. The recording and readout apparatus according to claim 11, wherein the detection means detects changes in a polarization angle of the reflected electromagnetic waves.

13. The recording and readout apparatus according to claim 11, wherein the electromagnetic waves are evanescent waves.

14. The recording and readout apparatus according to claim 11, wherein the recording head records the signal by applying a magnetic field in a direction substantially perpendicular to the recording medium.

15. A readout apparatus to reproduce information recorded in a magnetic recording medium comprising:

a readout head disposed opposite the magnetic recording medium;

the readout head including a laser beam emitting element, a magnetic slave layer disposed opposite the magnetic recording medium, a light shielding layer disposed opposite the magnetic recording medium and having a light transmitting portion smaller than a wavelength of the laser beam, to which the laser beam is radiated, to produce near field electromagnetic waves;

a detecting means to detect near field electromagnetic waves reflected from the magnetic recording medium.

16. The readout apparatus according to claim 15, wherein the detecting means detects changes in polarization angle of the reflected near field electromagnetic waves.

17. The readout apparatus according to claim 15, wherein information is recorded in the magnetic recording medium in a direction substantially perpendicular to the magnetic recording medium.

18. The readout apparatus according to claim 15, wherein the detecting means is arranged proximate to the light transmitting portion.

19. A recording and readout apparatus comprising:

a head member having a recording head to magnetically record a signal in a magnetic recording medium by applying only a magnetic field and a readout head to reproduce the signal recorded in the magnetic recording medium;

the readout head including a laser beam emitting element having a light emitting end opposing the magnetic recording medium; and a detecting means arranged opposite another end of the laser emitting element and to detect light reflected from the magnetic recording medium.

20. The recording and readout apparatus according to claim 19, wherein the detecting means detects changes in a polarization angle of the reflected light.

21. The recording and readout apparatus according to claim 19, wherein a distance between the light emitting end of the laser emitting element and a surface of a recording layer of the recording medium is smaller than a laser wavelength of the laser emitting element.

22. The recording and readout apparatus according to claim 19, wherein the laser emitting element is a semiconductor laser, whose light emitting end surface extends in a width direction of tracks formed on the recording medium.

23. The recording and readout apparatus according to claim 20, wherein the recording head records a signal by a magnetic field having a direction substantially perpendicular to the magnetic recording medium.

* * * * *